US009921082B2

(12) United States Patent
Reusing et al.

(10) Patent No.: US 9,921,082 B2
(45) Date of Patent: Mar. 20, 2018

(54) POSITION MEASUREMENT SYSTEM HAVING RECEIVER COILS WHICH ARE DIFFERENTIALLY INTERCONNECTABLE VIA SWITCHING MEANS

(71) Applicant: Robert Bosch GmbH, Stuttgart (DE)

(72) Inventors: Guenter Reusing, Niederwerrn (DE); Johannes Muehlfeld, Wuerzburg (DE)

(73) Assignee: Robert Bosch GmbH, Stuttgart (DE)

( * ) Notice: Subject to any disclaimer, the term of this patent is extended or adjusted under 35 U.S.C. 154(b) by 322 days.

(21) Appl. No.: 14/822,960

(22) Filed: Aug. 11, 2015

(65) Prior Publication Data
US 2016/0047676 A1 Feb. 18, 2016

(30) Foreign Application Priority Data

Aug. 13, 2014 (DE) .................. 10 2014 216 036

(51) Int. Cl.
*G01D 5/20* (2006.01)
(52) U.S. Cl.
CPC ......... *G01D 5/2006* (2013.01); *G01D 5/2066* (2013.01)
(58) Field of Classification Search
CPC .................... G01D 5/20–5/2093; G01B 7/003
USPC ......... 324/207.11–207.26, 654–657; 33/706, 33/708
See application file for complete search history.

(56) References Cited

U.S. PATENT DOCUMENTS 4,371,496 A * 2/1983 Lawson, II ............ G01B 7/003
324/207.18

9,013,192 B2 * 4/2015 Vasiloiu ................ G01B 7/003
324/207.17

FOREIGN PATENT DOCUMENTS

DE   10 2008 018 355 A1   10/2009
DE   10 2013 220 747 A1   4/2014

OTHER PUBLICATIONS

Wikipedia; Differential amplifier; Apr. 27, 2015; 9 Pages; Wikipedia Foundation, Inc.; http://en.wikipedia.org/wiki/Differential_amplifier.

(Continued)

*Primary Examiner* — Melissa Koval
*Assistant Examiner* — Rahul Maini
(74) *Attorney, Agent, or Firm* — Maginot, Moore & Beck LLP

(57) ABSTRACT

A position measurement system including a material measure and a scanning device movable relative to one another with respect to a measurement direction. The material measure has a plurality of markings which are arranged in a row with respect to the measurement direction, wherein the scanning device includes a transmitter winding arrangement. Multiple receiver coils are provided which are arranged in a row with respect to the measurement direction. The inductive coupling between the transmitter winding arrangement and the receiver coils is a function of the position of the scanning device with respect to the material measure. The transmitter winding arrangement defines multiple separate transmitter areas which are arranged in a row with respect to the measurement direction. A maximum of one single receiver coil is situated in each of the transmitter areas. At least one switching means is provided via which the two adjacent receiver coils are differentially interconnectable.

18 Claims, 4 Drawing Sheets

(56) References Cited

OTHER PUBLICATIONS

Texas Instruments; 0.9-Ω Dual SPST Analog Switch, 5-V/3.3V 2-Channel Analog Switch; Feb. 2013; 29 Pages; T55A23166; Texas Instruments Incorporated, www.ti.com.

* cited by examiner

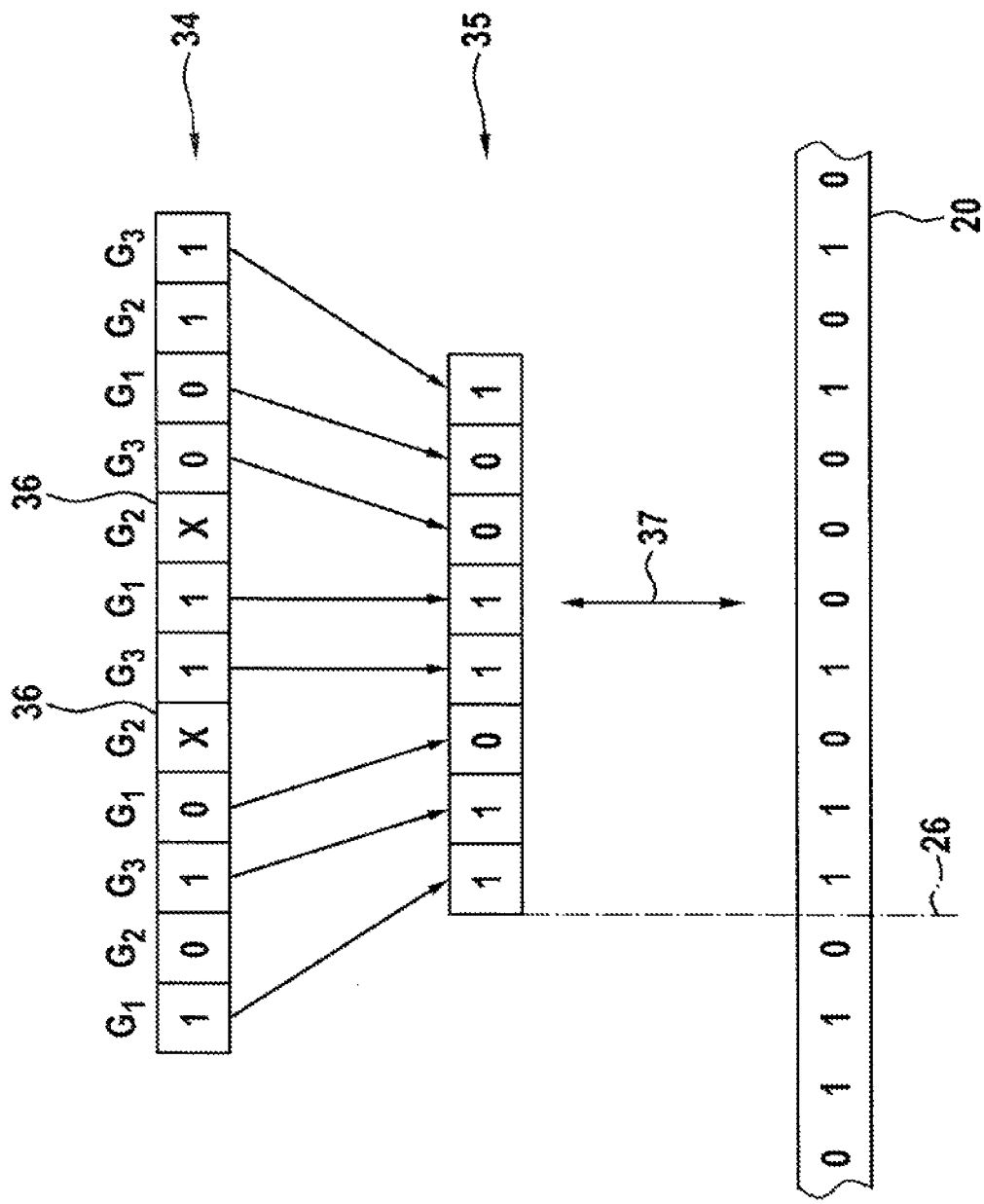

POSITION MEASUREMENT SYSTEM HAVING RECEIVER COILS WHICH ARE DIFFERENTIALLY INTERCONNECTABLE VIA SWITCHING MEANS

This application claims priority under 35 U.S.C. § 119 to application no. DE 10 2014 216 036.7, filed on Aug. 13, 2014 in Germany, the disclosure of which is incorporated herein by reference in its entirety.

BACKGROUND

The present disclosure relates to a position measurement system and a method for its operation.

A position measurement system is known from DE 10 2008 018 355 A1. The position measurement system is made up of a material measure and a scanning device which are movable relative to one another with respect to a measurement direction. The material measure is furnished with a plurality of markings which are arranged in a row with respect to the measurement direction and which encode a pseudorandom binary sequence (PRBS). The scanning device comprises a transmitter winding arrangement which generates an electromagnetic alternating field. Furthermore, multiple receiver coils are provided which are arranged in a row with respect to the measurement direction. The inductive coupling between the transmitter winding arrangement and the receiver coils is a function of the position of the scanning device with respect to the material measure.

The receiver coils are designed in the form of single coils having a single winding direction. However, one specific embodiment is also described in which differentially interconnected coil pairs are used. Here, two single receiver coils having an opposite winding direction are connected in series, which are essentially subjected to the same alternating field generated by the transmitter winding arrangement.

The disadvantage of the single receiver coils is that their signal has a high offset. That is, the signal changes which are caused by the movement of the position measurement system are small with respect to the average value of the signal, which is referred to as the offset. This makes the signal evaluation considerably more difficult. The coil pairs have a small offset, but they require a large amount of space. It is not possible to implement the targeted division period of the material measure of 1 mm and a correspondingly small division period of the scanning device in an economical manner.

SUMMARY

The object of the present disclosure is to overcome the aforementioned disadvantages.

It is provided that the transmitter winding arrangement defines multiple separate transmitter areas which are arranged in a row with respect to the measurement direction, wherein a maximum of one single receiver coil is situated in each of the transmitter areas, wherein at least one switching means is provided via which two adjacent receiver coils are differentially interconnectable. The provided position measurement system has the same space requirement as the known single receiver coils. The differential interconnection of the receiver coils via the switching means achieves an offset which is small in comparison to that of the known differential coil pairs.

Preferably, no receiver coils are situated in the transmitter areas located on the end with respect to the measurement direction, since the magnetic field there deviates too strongly from the corresponding fields in the inner transmitter areas. The receiver coils are preferably coils having a uniform winding direction of the corresponding conductor tracks. The transmitter winding arrangement is preferably connected to an alternating current source which has a frequency of, for example, 100 kHz. The transmitter winding arrangement preferably has two groups of parallel, serpentine conductor tracks, wherein the conductor tracks of the two groups cross multiple times. Directly adjacent transmitter areas are preferably permeated by an electromagnetic field having an opposite magnetic flux direction. The receiver coils preferably all have the same winding direction, wherein they are most highly preferably designed identically. Preferably, directly adjacent receiver coils are interconnected via the switching means, between which only conductor tracks of the transmitter winding arrangement are situated. The transmitter winding arrangement and/or the receiver coils are preferably designed in a planar manner, i.e., the corresponding ones run in one or multiple planes which are electrically insulated from one another.

Furthermore, a method for operating this position measurement system is provided, wherein different pairs of receiver coils are differentially interconnected in succession via the associated switching means, wherein at least one receiver coil is used for reading two different markings in one position of the position measurement system. As a result, only n+1 receiver coils or single coils are required for reading a number n of markings, while in the case of the known differential coil pairs, 2×n single coils are required. As a result, the space requirement is significantly reduced.

Advantageous refinements and improvements are specified in the disclosure.

It is preferred that a differential amplifier is provided, via which the receiver coils are differentially interconnectable via the at least one switching means. Preferably, the output of the differential amplifier is connected to an analog-digital converter. The scanning device preferably has a programmable digital computer which is connected to the analog-digital converter. The comparatively weak signals of the receiver coils are amplified by the differential amplifier before they are fed to the analog-digital converter. As a result, interference which acts on the conductor route between the differential amplifier and the analog-digital converter has little effect on the signal, since the signal is comparatively strong there. In addition, the differential amplifier brings about the difference formation required for the differential interconnection. Without the differential amplifier, many more switching means would have to be employed in order to bring about the difference formation. A differential amplifier is an electronic amplifier having two inputs, in which the difference between the two input signals is amplified, instead of a single signal (http://en.wikipedia.org/wiki/Differential_amplifier).

It is preferred that a separate switching means is associated with each receiver coil, wherein a first signal line and a second signal line are provided, to which the receiver coils are connected via the associated switching means. With this circuit configuration, particularly few switching means are required in order to bring about the required differential interconnections of the receiver coils.

It is preferred that the differential amplifier has a positive input and a negative input, wherein the first signal line is connected to the positive input, wherein the second signal line is connected to the negative input. Thus, the desired differential interconnection of the receiver coils is brought about in a particularly simple manner.

It is preferred that the receiver coils are alternately connected to the first signal line and the second signal line in such a way that two directly adjacent receiver coils are connected to different signal lines. As a result, the desired differential interconnection of adjacent receiver coils is made possible.

It is preferred that the at least one switching means has a first state in which it has a first electrical resistance, wherein it has a second state in which it has a second electrical resistance, wherein the second electrical resistance is at least 1000 times greater than the first electrical resistance, wherein the at least one switching means is switchable between the first state and the second state. The switching means may be a mechanical switch, for example, a relay. In the first state, the switch is closed, so that the first resistance is virtually zero. In the second state, the switch is open, so that the second resistance is virtually infinitely high. However, such switching means function slowly; therefore, switching means based on semiconductors are preferred. Thus, for example, a first electrical resistance of 0.9Ω may be attained, whereas a second electrical resistance may be attained which produces a signal attenuation of at least 60 dB. A corresponding switching means is the subject matter of the data sheet which was available on 17 Jul. 2014 at the Internet address http://www.ti.com.cn/cn/lit/ds/symlink/ts5a23166.pdf.

It is preferred that the markings are formed from openings in a metal tape, wherein the width and the spacing of each of the openings is an integer multiple of a constant, first division interval λ. In such a material measure, the webs between the markings known from DE 10 2008 018 355 A1 are omitted. Therefore, the marking density is particularly high. Furthermore, such a material measure may be formed mirror-symmetrically, transverse to the measurement direction. Therefore, there is no concern that the material measure will warp if the metal tape is subjected to tensile stress in order to set the first division interval λ precisely. The openings are preferably formed as a rectangle whose sides run in parallel to or perpendicular to the measurement direction.

It is preferred that the receiver coils have a constant second division interval δ, wherein the condition r×λ=s×δ applies, where r and s are integers in which s>r. It is thus ensured that in any position of the position measurement system, at least a portion of the receiver coils is situated above the markings in such a way that all required markings may be read off reliably. The condition 2×λ=3×δ very highly preferably applies. Therefore, a particularly simple signal evaluation results, which is described in greater detail below with reference to FIG. 3.

It is preferred that the markings form a random number sequence, wherein any arbitrary selection of a number m of directly adjacent markings is different from any other arbitrary selection of a number m of directly adjacent markings, wherein at least one selection of m−1 directly adjacent markings occurs in at least two positions of the code, wherein e≥1.2×m×s÷r applies, where e is the number of receiver coils. Accordingly, more markings are read off than are necessarily required for determining the absolute position. As a result, it is possible to detect and, if necessary, correct errors when reading the markings. Preferably, a random number sequence corresponding to DE 10 2013 220 747 A1 is used. The entire content of DE 10 2013 220 747 A1 is referenced and is made the content of the present application.

Preferably, a material measure is used which has a plurality of markings arranged in a row, each encoding one of two values, wherein any arbitrary first selection of a number m of adjacent markings is different from any arbitrary other second selection of m adjacent markings, wherein the number k of the markings on the material measure is at least 10 times greater than m, wherein the second selection is then also different from the first selection if the value of at least any single marking is replaced by another value in the first selection as well as in the second selection.

It is preferred that all receiver coils on the side facing away from the associated switching means are electrically connected to the same voltage level. As a result, the circuit configuration is simplified considerably, in which case particularly few switching means are required. The corresponding electrical connection is preferably established in physical proximity to the switching means in order to avoid ground loops.

It is preferred that an actuation device is provided for the switching means which includes multiple D flip-flops which are interconnected in the form of a shift register which has a clock input and multiple taps, wherein the switching means are actuated by an associated tap.

It is to be understood that the aforementioned features and the features to be explained hereinafter are applicable not only in each specified combination, but also in other combinations or alone, without departing from the scope of the present disclosure.

BRIEF DESCRIPTION OF THE DRAWINGS

Exemplary embodiments of the disclosure are presented in the drawings an are explained in more detail in the description below.

In the drawings:

FIG. 4 shows code examples which may occur during the operation of a position measurement system according to the present disclosure.

DETAILED DESCRIPTION

Figure 1:
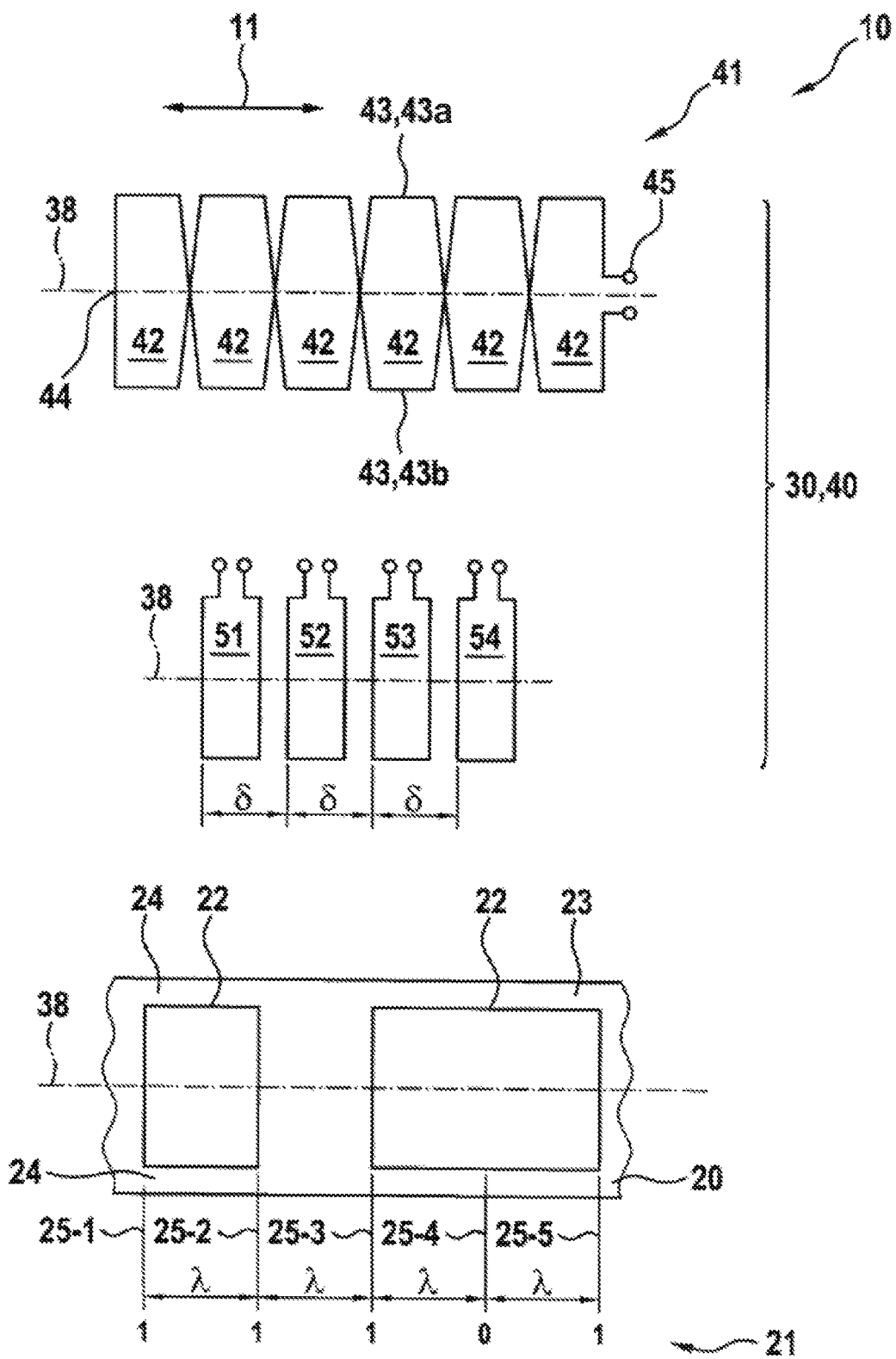
FIG. 1 shows a simplified schematic representation of the transmitter winding arrangement, the receiver coils, and the material measure of a position measurement system according to the present disclosure.

FIG. 1 shows a simplified schematic representation of the transmitter winding arrangement 41, the receiver coils 51 to 54, and the material measure 20 of a position measurement system 10. For the sake of clarity, the transmitter winding arrangement 41, the receiver coils 51 to 54, and the material measure 20 are depicted adjacent to one another, transverse to the measurement direction 11, wherein they are actually situated one above the other in such a way that the plotted center lines 38 coincide. The proportions are correctly depicted in the measurement direction 11, which runs parallel to the aforementioned center line 38.

The transmitter winding arrangement 41 and the receiver coils 51 to 54 are immovably arranged relative to one another in a scanning head. The scanning head is movable relative to the material measure 20 with respect to the measurement direction 11.

The transmitter winding arrangement 41 comprises a first group and a second group 43a; 43b of serpentine conductor tracks 43. Contrary to the actual conditions, only one single conductor track 43 from each group 43a; 43b is shown in each case, whereas a plurality of conductor tracks 43 is actually present, wherein the conductor tracks 43 of one group 43a; 43b run essentially in parallel among each other. The conductor tracks 43 are arranged in different planes of a planar conductor track arrangement which are electrically insulated from each other, wherein vias (not depicted) are provided between the aforementioned planes in the vicinity of the boundary 44 and the connectors 45. The serpentine conductor tracks 43 of the two groups 43a; 43b intersect, wherein they are electrically connected to one another only via the aforementioned vias.

Altogether, the transmitter winding arrangement defines multiple transmitter areas 42 which are identical to one another and arranged in a row with respect to the measurement direction 11. The magnitude of the electromagnetic field is the same in all transmitter areas 42 if the transmitter winding arrangement 41 is supplied with alternating current via an alternating current source (no. 46 in FIG. 2) at the connectors 45. The direction of the magnetic flux in directly adjacent transmitter areas is exactly opposite, wherein it is oriented essentially perpendicular to the drawing plane of FIG. 1 in each case.

At most, one single receiver coil 51 to 54 is situated within the transmitter areas 42. No receiver coil is situated in the two transmitter areas 42 located on the end with respect to the measurement direction 11, since, because of edge effects, fields act there which are somewhat different from the ones in the inner transmitter areas.

The receiver coils 51 to 54 each have a plurality of winding revolutions having a uniform winding direction, whereas only a single winding revolution is depicted in each case in FIG. 1. The receiver coils 51 to 54 are an integral part of the same planar conductor track arrangement as the transmitter winding arrangement 41.

The material measure 20 is a metal tape which preferably has a constant thickness. Preferably, it is manufactured from a ferromagnetic material, for example, stainless steel, using a photochemical etching method. The metal tape 20 is provided with a plurality of rectangular openings 22 whose width and spacing are an integer multiple of a first division interval $\lambda$. The rectangular sides of the openings 22 run in parallel to or perpendicularly to the measurement direction 11. A continuous side web 23 continues in the measurement direction 11 on both sides, adjacent to the openings 22. Overall, the material measure 20 is designed mirror-symmetrically with respect to the center line 38, so that it does not warp if it is subjected to tensile stress for the purpose of setting an exact first division interval $\lambda$.

The rectangular sides of the openings 22 running transverse to the measurement direction 11 are each arranged on an associated grid line 25-1 to 25-5 of the marking grid, wherein directly adjacent grid lines 25-1 to 25-5 each have the first division interval $\lambda$. The material measure 20 encodes the value "1" if a change occurs on a grid line 25-1 to 25-5 from material to free space, or vice-versa. The material measure 20 encodes the value "0" if no such change takes place, i.e., if either material or free space is present on both sides of the grid line 25-1 to 25-5. The corresponding code is designed in such a way that it is ensured that at least one pair of adjacent receiver coils 51 to 54 is able to detect a value of "1" in an optimal manner, regardless of the position of the position measurement system.

The second division interval $\delta$ of the receiver coils 51 to 54 is constant, wherein the condition $2\times\lambda=3\times\delta$ is presently fulfilled, as the signal evaluation is then particularly simple. However, it is also conceivable to apply the condition $4\times\lambda=5\times\delta$. Fewer receiver coils 51 to 54 are then required, whereas the signal evaluation is more complex.

Figure 2:
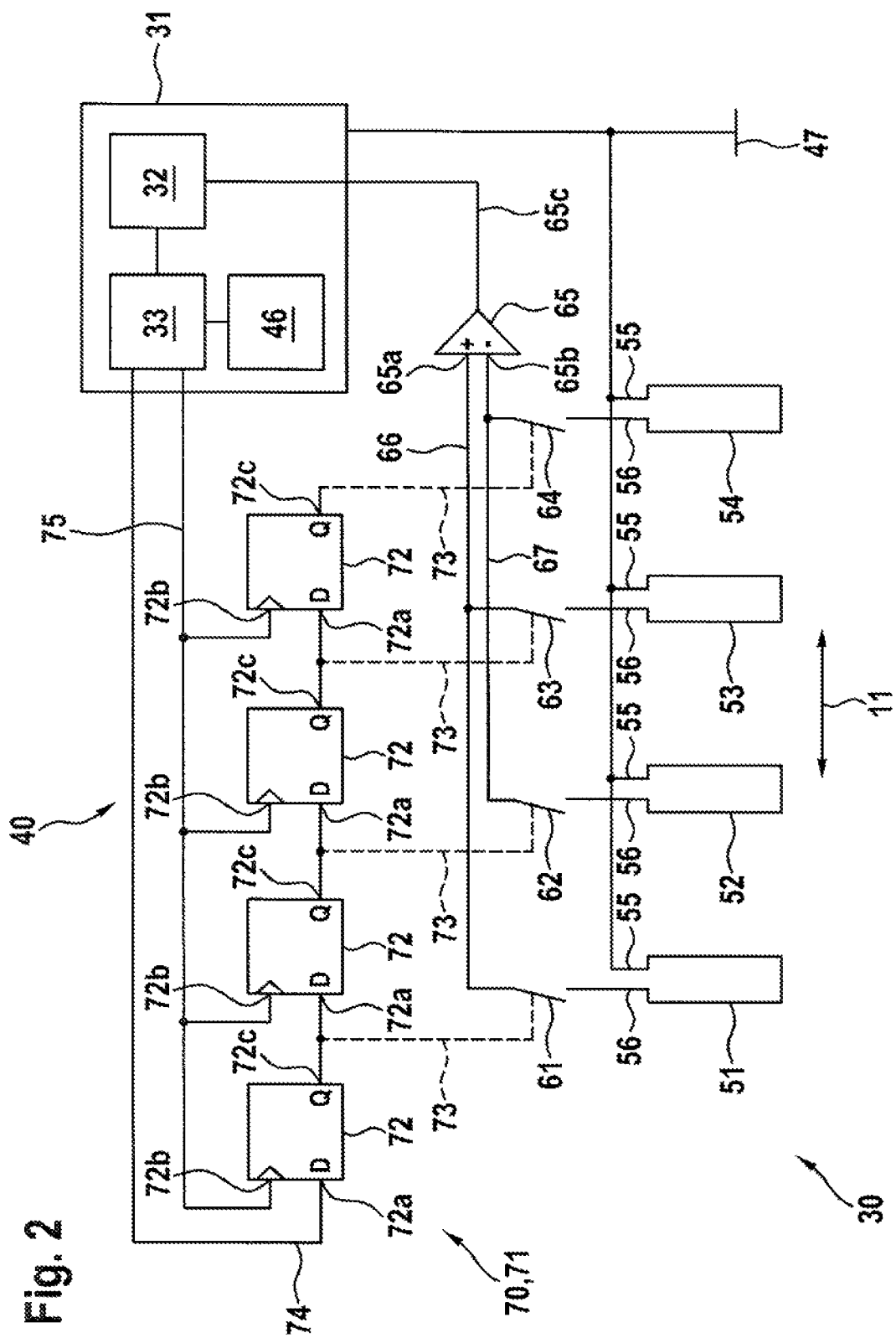
FIG. 2 shows a schematic circuit diagram of the scanning device of the position measurement system according to FIG. 1.

FIG. 2 shows a schematic circuit diagram of the scanning device 30 of the position measurement system according to FIG. 1. The scanning device 30 comprises a sensor unit 40 and an evaluation unit 31. The evaluation unit 31 is preferably a separate printed circuit board on which the assemblies framed under the reference number 31 are arranged. The remaining components depicted in FIG. 2 are arranged in direct spatial proximity to one another, wherein the receiver coils 51 to 54 in turn are arranged on the material measure having a small distance from the markings. In the specific embodiment depicted in FIG. 2, particularly few connection lines 74; 75; 65c are required between the sensor unit 40 and the evaluation unit 31.

A first terminal 55 of all receiver coils 51 to 54 is connected to a common voltage level 47. The common voltage level 47 may be the ground potential. If the differential amplifier 65 has an asymmetrical voltage supply, the common voltage level 47 may be the average voltage of this voltage supply. The common voltage level 47 may also be present at the evaluation unit 31, in particular at the analog-digital converter 32 there. The other, second terminal 56 of each of the receiver coils 51 to 54 is connected to a switching means 61 to 64 in the form of a switch based on semiconductors. Each of the switching means 61 to 64 is connected either to a first signal line or a second signal line 66; 67. The receiver coils 51 to 54 are alternately connected to the first signal line and the second signal line 66; 67 in such a way that two directly adjacent receiver coils 51 to 54 are connected to different signal lines 66; 67.

Furthermore, a differential amplifier 65 is provided which has a positive input and a negative input 65a; 65b and an output 65c. The first signal line 66 is connected to the positive input 65a, and the second signal line 67 is connected to the negative input 65b. A state is considered below by way of example, in which the switching means 61 and 62, which are associated with the directly adjacent receiver coils 51; 52, are closed, whereas the remaining switching means 63; 64 are open. Therefore, the voltage which is induced in the first receiver coil 51 by the transmitter winding arrangement (no. 41 in FIG. 1) is present at the positive input 65a, and the voltage which is induced in the second receiver coil 52 by the transmitter winding arrangement is present at the negative input 65b. The differential amplifier 65 amplifies the difference between these voltages and passes the amplified voltage difference to the analog-digital converter 32 via its output 65c. Accordingly, in the presently described example, the first receiver coil and the adjacent second receiver coil 51; 52 are differentially interconnected via the first switching means and the second switching means 61; 62.

The switching means 61 to 64 are actuated with the aid of an actuation device 70 which has a shift register 71. The shift register 71 is made up of multiple D flip-flops 72, a D flip-flop 72 being associated with each switching means 61 to 64. Each of the D flip-flops 72 has a clock input 72b, a data input 72a, and an output 72c. Each output 72c of a D flip-flop 72 is connected to the data input 72a of the D flip-flop 72 which is associated with the next receiver coil 51 to 54 with respect to the measurement direction 11. The clock inputs 72b of all D flip-flops are connected in parallel via a clock line 75 to a programmable digital computer 33 in the evaluation unit 31, so that they continue to be clocked simultaneously. Furthermore, the data input 72a of the first D flip-flop 72 in the series is connected to the aforementioned digital computer 33 via the data line 74. Each of the outputs 72c of the D flip-flops forms a tap 73 via which the associated switching means 61 to 64 is controlled. The switching means 61 to 64 is, for example, switched to a first state having a low electrical resistance if a logical "1" is present at the associated tap 73, whereas it is switched to a second state having a significantly higher electrical resistance if a logical "0" is present at the tap 73.

The digital computer 33 initially applies a logical "0" to the data line, which is clocked into all D flip-flops 72 over four clock signals presently on the clock line. A logical "0" is then present at all taps 73, so that all switching means 61 to 64 are open. Subsequently, a logical "1" is applied to the data line 74 over two additional clocks, so that a logical "1" is present at the taps of the first two D flip-flops, whereas a logical "0" is present at all remaining taps. Thus, the first receiver coil and the second receiver coil 51; 52 are connected to the differential amplifier 65. With each additional clock, a logical "0" is now again present on the data line 74, so that the two aforementioned logical "1" values are advanced by one position of the shift register 71 with every clock pulse. Subsequently, each following adjacent pair of receiver coils 51 to 54 in the measurement direction 11 is connected to the differential amplifier 65 with each clock pulse.

From the digital values output by the analog-digital converter 32, the digital computer 33 ascertains the absolute position which the scanning device assumes with respect to the material measure.

It goes without saying that significantly more receiver coils are preferably used than the four receiver coils 51 to 54 depicted. For example, it is conceivable to use 40 receiver coils which have a second division interval $\delta$ of 0.667 mm, whereas the material measure has a first division interval $\lambda$ of 1.000 mm. It is also conceivable to use 33 receiver coils which have into a second division interval $\delta$ of 0.800 mm, whereas the material measure has a first division interval $\lambda$ of 1.000 mm.

The circuit depicted in FIG. 2 may in principle be expanded by any number of receiver coils 51 to 54.

Figure 3:
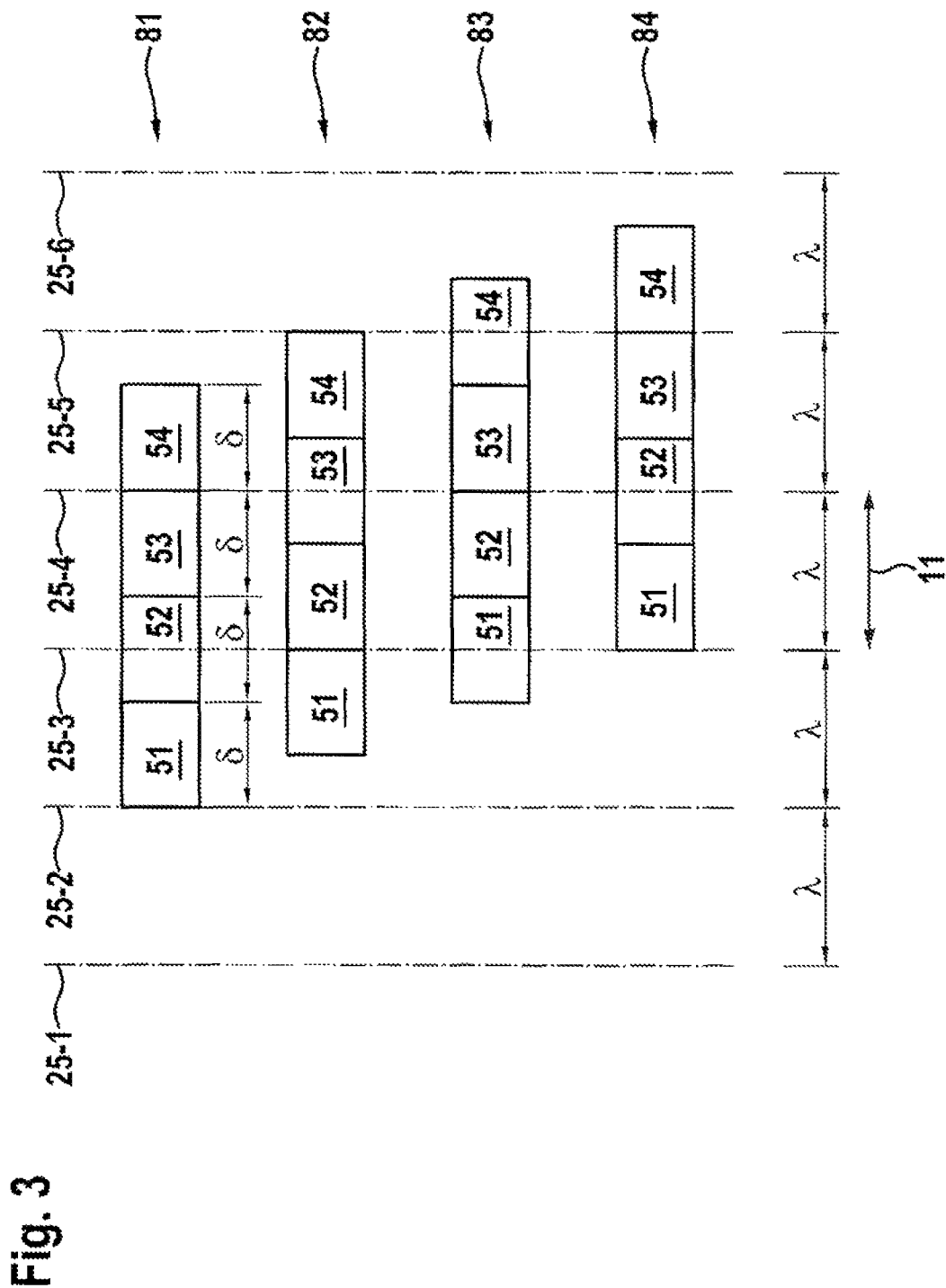
FIG. 3 shows a simplified schematic representation having different positions of the receiver coil with respect to the material measure.

FIG. 3 shows a simplified schematic representation having different positions of the receiver coils with respect to the material measure. Only the aforementioned grid lines 25-1 to 25-6 from the material measure are depicted as vertical dash-dotted lines. As already described, the change from material to free space used for the encoding takes place only at these positions. Any two directly adjacent grid lines 25-1 to 25-6 have the first division interval $\lambda$.

Furthermore, the receiver coils 51 to 54 are depicted as rectangles whose width is equal to the second division interval $\delta$, wherein the condition $2\times\lambda=3\times\delta$ is presently fulfilled. The aforementioned rectangles indicate the area of the material measure which has an influence on the voltage induced in the relevant receiver coil 51 to 54.

Furthermore, FIG. 2 depicts four limit positions 81 to 84, one above the other, of the receiver coils 51 to 54 with respect to the material measure or the corresponding grid lines 25-1 to 25-6.

In the first limit position 81, the pair made up of the first receiver coil and second receiver coil 51; 52 is influenced only by the conditions at the grid line 25-3. The pair made up of the second receiver coil and the third receiver coil 52; 53 is also influenced only by the conditions at the grid line 25-3. The pair made up of the third receiver coil and the fourth receiver coil 53; 54 is influenced only by the conditions at the grid line 25-4.

Thus, the code at the grid line 25-4 may be ascertained only by evaluating the differentially interconnected pair made up of the third receiver coil and the fourth receiver coil 53; 54.

If the receiver coils 51 to 54 are now shifted in the direction of the second limit position 82, it is seen that the pair made up of the second receiver coil and the third receiver coil 52; 53 reaches the area of influence of the two grid lines 25-3 and 25-4, while the pair made up of the first receiver coil 51 and the second receiver coil 52 remains only in the area of influence of the grid line 25-3. Thus, the code at the grid line 25-3 in this phase of movement may be ascertained only by evaluating the differentially interconnected pair made up of the first receiver coil and the second receiver coil 51; 52.

The present reasoning may be easily applied to the phase of movement during the transition from the second limit position to the third limit position 82; 83. Here, the pair made up of the first receiver coil and the second receiver coil 51; 52 is influenced only by the conditions at the grid line 25-3, whereas the pair made up of the second receiver coil and the third receiver coil 52; 53 is influenced only by the conditions at the grid line 25-4.

During the transition from the third limit position to the fourth limit position 83; 84, the pair made up of the second receiver coil and the third receiver coil 52; 53 is influenced only by the grid line 25-4, whereas the pair made up of the third receiver coil and the fourth receiver coil 53; 54 is influenced only by the conditions at the grid line 25-5.

The fourth limit position 84 corresponds to the first limit position 81, wherein it is shifted exactly by a first division interval $\lambda$. Since the condition $2\times\lambda=3\times\delta$ is presently fulfilled, the present reasoning may be applied to a scanning device which has any number of receiver coils which are arranged in a row in the measurement direction 11. It is ensured that there is a sufficient number of pairs of receiver coils 51 to 54, each being influenced only by the conditions at a single grid line 25-1 to 25-6.

FIG. 4 shows code examples which may occur during the operation of a position measurement system according to the present disclosure. The codes which were read off from the material measure using the receiver coils are indicated by the reference numeral 34. In the present example, 12 codes were read off, whereas the corresponding scanning device has 13 receiver coils. Since the condition $2\times\lambda=3\times\delta$ is presently fulfilled, a total of three groups $G_1$; $G_2$; $G_3$ of codes result, each comprising 12÷3=4 code bits. The code bits of a group $G_1$; $G_2$; $G_3$ are spaced apart from each other by three code positions.

The codes for which no code value was able to be unambiguously associated with the measured value ascertained by the analog-digital converter are indicated by the letter "X". This is due to the fact that the corresponding codes were ascertained by a pair of adjacent receiver coils which is influenced by the conditions at two adjacent grid lines. The ambiguous codes 36 are all in the same group, presently in the group $G_2$. The code values of the group $G_2$ are thus presently discarded, so that the code values 35 which are used are taken only from the groups $G_1$ and $G_2$.

The code values 35 which are used are now compared with the random number sequence which is applied to the material measure 20. This random number sequence is stored in the digital computer (no. 33 in FIG. 2) in a suitable form, so that the corresponding comparison may be easily carried out by the digital computer. The position 26 of the code 35 which was read off within the stored random number sequence corresponds to the absolute position which the scanning device assumes with respect to the material measure. Codes which differ from one another in only one position are presently considered to be equal.

The aforementioned random number sequence is preferably ascertained using the method described in DE 10 2013

220 747 A1, so that at least a one-bit error correction is possible.

Thus, in the present example, it is possible to compensate for the read error which has occurred at the position indicated by the reference numeral 37.

LIST OF REFERENCE NUMBERS $G_i$ Group of code bits
$\lambda$ First division interval
$\delta$ Second division interval
m Width of the random code
10 Position measurement system
11 Measurement direction
20 Material measure
21 Marking
22 Opening
23 Metal tape
24 Side web
25-1 to 25-6 Grid line of the marking grid
26 Position within the random code
30 Scanning device
31 Evaluation unit
32 Analog-digital converter
33 Programmable digital computer
34 Read-off code values
35 Code values used
36 Ambiguous bit
37 Erroneous bit
38 Center line
40 Sensor unit
41 Transmitter winding arrangement
42 Transmitter area
43 Serpentine conductor track
43a First group
43b Second group
44 Boundary between the two groups of serpentine conductor tracks
45 Terminal of the transmitter winding arrangement
46 Alternating current source
47 Common voltage level
51 First receiver coil
52 Second receiver coil
53 Third receiver coil
54 Fourth receiver coil
55 First terminal of a receiver coil
56 Second terminal of a receiver coil
61 First switching means
62 Second switching means
63 Third switching means
64 Fourth switching means
65 Differential amplifier
65a Positive input of the differential amplifier
65b Negative input of the differential amplifier
65c Output of the differential amplifier
66 First signal line
67 Second signal line
70 Actuation device
71 Shift register
72 D flip-flop
72a Data input
72b Clock input
72c Output
73 Tap
74 Data line
75 Clock line
81 First limit position
82 Second limit position
83 Third limit position
84 Fourth limit position

What is claimed is:

1. A position measurement system comprising:
a material measure having a plurality of markings arranged in a row with respect to a measurement direction; and
a scanning device that is configured to move relative to the material measure in the measurement direction, the scanning device comprising:
a transmitter winding arrangement having a plurality of transmitter areas arranged in a row with respect to the measurement direction;
a plurality of receiver coils arranged in a row with respect to the measurement direction, a maximum of one single receiver coil of the plurality of receiver coils being situated in each of the transmitter areas, an inductive coupling between the transmitter winding arrangement and the plurality of receiver coils being a function of a position of the scanning device with respect to the material measure;
a plurality of switching devices configured to differentially interconnect at least two adjacent receiver coils of the plurality of receiver coils between a first signal line and a second signal line, the plurality of switching devices having a separate switching device associated with each receiver coil of the plurality of receiver coils; and
a differential amplifier connected to the first signal line and the second signal line,
wherein the plurality of switching devices is configured to alternately connect the receiver coils of the plurality of receiver coils to the first signal line and the second signal line such that any two directly adjacent receiver coils of the plurality of receiver coils are connected to a different one of the first signal line and the second signal line.

2. The position measurement system according to claim 1, the differential amplifier further comprising:
a positive input connected to the first signal line; and
a negative input connected to the second signal line.

3. The position measurement system according to claim 1, wherein each switching device of the plurality of switching devices is configured to switch between a first state having a first electrical resistance and a second state having a second electrical resistance, the second electrical resistance being at least 1000 times greater than the first electrical resistance.

4. The position measurement system according to claim 1, wherein the plurality of markings of the material measure are formed by openings in a metal tape, the width and the spacing of each of the openings being an integer multiple of a first division interval $\lambda$.

5. The position measurement system according to claim 4, wherein the plurality of receiver coils are each separated by a distance corresponding to a second division interval $\delta$, wherein the condition $r \times \lambda = s \times \delta$ applies, where r and s are integers in which $s > r$.

6. The position measurement system according to claim 5, wherein the plurality of markings of the material measure form a random number sequence, any arbitrary selection of a number m of directly adjacent markings of the plurality of markings being different from any other arbitrary selection of a number m of directly adjacent markings of the plurality of markings, at least one selection of m−1 directly adjacent markings of the plurality of markings occurring in at least two positions of the random number sequence, wherein e≥1.2×m×s÷r applies, where e is a number of receiver coils in the plurality of receiver coils.

7. The position measurement system according to claim 1, wherein all receiver coils of the plurality of receiver coils that are on a side facing away from an associated switching device of the at least one switching device are electrically connected to a same voltage level.

8. The position measurement system according to claim 1, the scanning device further comprising:
an actuation device configured to actuate the plurality of switching devices, the actuation device having a plurality of D flip-flops that are interconnected in the form of a shift register having a clock input and a plurality taps, each of the plurality of taps being configured to actuate a corresponding switching device of the plurality of switching devices.

9. A method for operating a position measurement system comprising a material measure having a plurality of markings arranged in a row with respect to a measurement direction, and a scanning device that is configured to move relative to the material measure in the measurement direction, the scanning device comprising a transmitter winding arrangement having a plurality of transmitter areas arranged in a row with respect to the measurement direction, a plurality of receiver coils arranged in a row with respect to the measurement direction, a maximum of one single receiver coil of the plurality of receiver coils being situated in each of the transmitter areas, an inductive coupling between the transmitter winding arrangement and the plurality of receiver coils being a function of a position of the scanning device with respect to the material measure, and at least one switching device configured to differentially interconnect at least two adjacent receiver coils of the plurality of receiver coils, the method comprising
differentially interconnecting in succession different pairs of receiver coils of the plurality of receiver coils via an associated switching device of the at least one switching device; and
using at least one receiver coil of the plurality of receiver coils to read two different markings of the plurality of markings of the material measure in one position of the position measurement system.

10. A position measurement system comprising:
a material measure having a plurality of markings arranged in a row with respect to a measurement direction; and
a scanning device that is configured to move relative to the material measure in the measurement direction, the scanning device comprising:
a transmitter winding arrangement having a plurality of transmitter areas arranged in a row with respect to the measurement direction;
a plurality of receiver coils arranged in a row with respect to the measurement direction, a maximum of one single receiver coil of the plurality of receiver coils being situated in each of the transmitter areas, an inductive coupling between the transmitter winding arrangement and the plurality of receiver coils being a function of a position of the scanning device with respect to the material measure; and
at least one switching device configured to differentially interconnect at least two adjacent receiver coils of the plurality of receiver coils,
wherein the plurality of markings of the material measure are formed by openings in a metal tape, the width and the spacing of each of the openings being an integer multiple of a first division interval $\lambda$, and
wherein the plurality of receiver coils are each separated by a distance corresponding to a second division interval $\delta$, wherein the condition $r\times\lambda=s\times\delta$ applies, where r and s are integers in which s>r.

11. The position measurement system according to claim 10, the scanning device further comprising:
a differential amplifier connected to the at least one switching device to differentially connect the at least two adjacent receiver coils of the plurality of receiver coils.

12. The position measurement system according to claim 11, the at least one switching device further comprising:
a plurality of switching devices having a separate switching device associated with each receiver coil of the plurality of receiver coils, the plurality of switching devices being configured to connect the plurality of receiver coils to a first signal line and a second signal line.

13. The position measurement system according to claim 12, the differential amplifier further comprising:
a positive input connected to the first signal line; and
a negative input connected to the second signal line.

14. The position measurement system according to claim 12, wherein the plurality of switching devices is configured to alternately connect the receiver coils of the plurality of receiver coils to the first signal line and the second signal line such that any two directly adjacent receiver coils of the plurality of receiver coils are connected to a different one of the first signal line and the second signal line.

15. The position measurement system according to claim 10, wherein the at least one switching device is configured to switch between a first state having a first electrical resistance and a second state having a second electrical resistance, the second electrical resistance being at least 1000 times greater than the first electrical resistance.

16. The position measurement system according to claim 10, wherein the plurality of markings of the material measure form a random number sequence, any arbitrary selection of a number m of directly adjacent markings of the plurality of markings being different from any other arbitrary selection of a number m of directly adjacent markings of the plurality of markings, at least one selection of m−1 directly adjacent markings of the plurality of markings occurring in at least two positions of the random number sequence, wherein e≥1.2×m×s÷r applies, where e is a number of receiver coils in the plurality of receiver coils.

17. The position measurement system according to claim 10, wherein all receiver coils of the plurality of receiver coils that are on a side facing away from an associated switching device of the at least one switching device are electrically connected to a same voltage level.

18. The position measurement system according to claim 10, the scanning device further comprising:
an actuation device configured to actuate the at least one the switching device, the actuation device having a plurality of D flip-flops that are interconnected in the form of a shift register having a clock input and a plurality taps, each of the plurality of taps being configured to actuate a corresponding switching device of the at least one switching device.

* * * * *

UNITED STATES PATENT AND TRADEMARK OFFICE
CERTIFICATE OF CORRECTION

PATENT NO. : 9,921,082 B2
APPLICATION NO. : 14/822960
DATED : March 20, 2018
INVENTOR(S) : Reusing et al.

Page 1 of 1

It is certified that error appears in the above-identified patent and that said Letters Patent is hereby corrected as shown below:

On the Title Page

On page 2, the OTHER PUBLICATIONS subsection of item (56) should read:
TEXAS INSTRUMENTS; 0.9-ΩDual SPST Analog Switch, 5-V/3.3V
2-Channel Analog Switch; Feb. 2013; 29 Pages; TS5A23166; Texas
Instruments Incorporated, www.ti.com.

Signed and Sealed this
Twenty-fourth Day of July, 2018

Andrei Iancu
*Director of the United States Patent and Trademark Office*